United States Patent

Verstraelen et al.

[15] 3,646,252

[45] Feb. 29, 1972

[54] DECODER ARRANGEMENT FOR A SIGNAL TRANSMISSION SYSTEM EMPLOYING INFORMATION TRANSMISSION BY MEANS OF A QUADRATURE-MODULATED CARRIER

[72] Inventors: Marie Marcel Arnold Antoine Ghislain Verstraelen; John Richard Reynders, both of Hilversum, Netherlands

[73] Assignee: U.S. Philips Corporation, New York, N.Y.

[22] Filed: June 8, 1970

[21] Appl. No.: 44,315

[30] Foreign Application Priority Data

June 10, 1969 Netherlands..........................6908782

[52] U.S. Cl.........................178/5.4 SD, 178/5.4 SY, 329/50

[51] Int. Cl........................................H04n 9/46, H04n 9/50

[58] Field of Search.................178/5.4 SD, 5.4 SY, 69.5 CB; 329/50

[56] References Cited

UNITED STATES PATENTS

| | | | |
|---|---|---|---|
| 3,003,024 | 10/1961 | Nygard et al. | 178/5.4 SD |
| 3,342,930 | 9/1967 | Kool | 178/5.4 SY |

*Primary Examiner*—Robert L. Richardson
*Attorney*—Frank R. Trifari

[57] ABSTRACT

A decoder arrangement for a quadrature-modulated signal having periodically occurring bursts of each of the two quadrature components wherein during the recovery of the two carrier components required for demodulation of the signal—so as to avoid crosstalk between the quadrature components during the demodulation—a double-phase control system each active on one of the bursts is used which maintains each of these carrier components separately accurately 90° shifted in phase relative to the quadrature component which must be suppressed in the relevant demodulator.

5 Claims, 3 Drawing Figures

Figure 1:
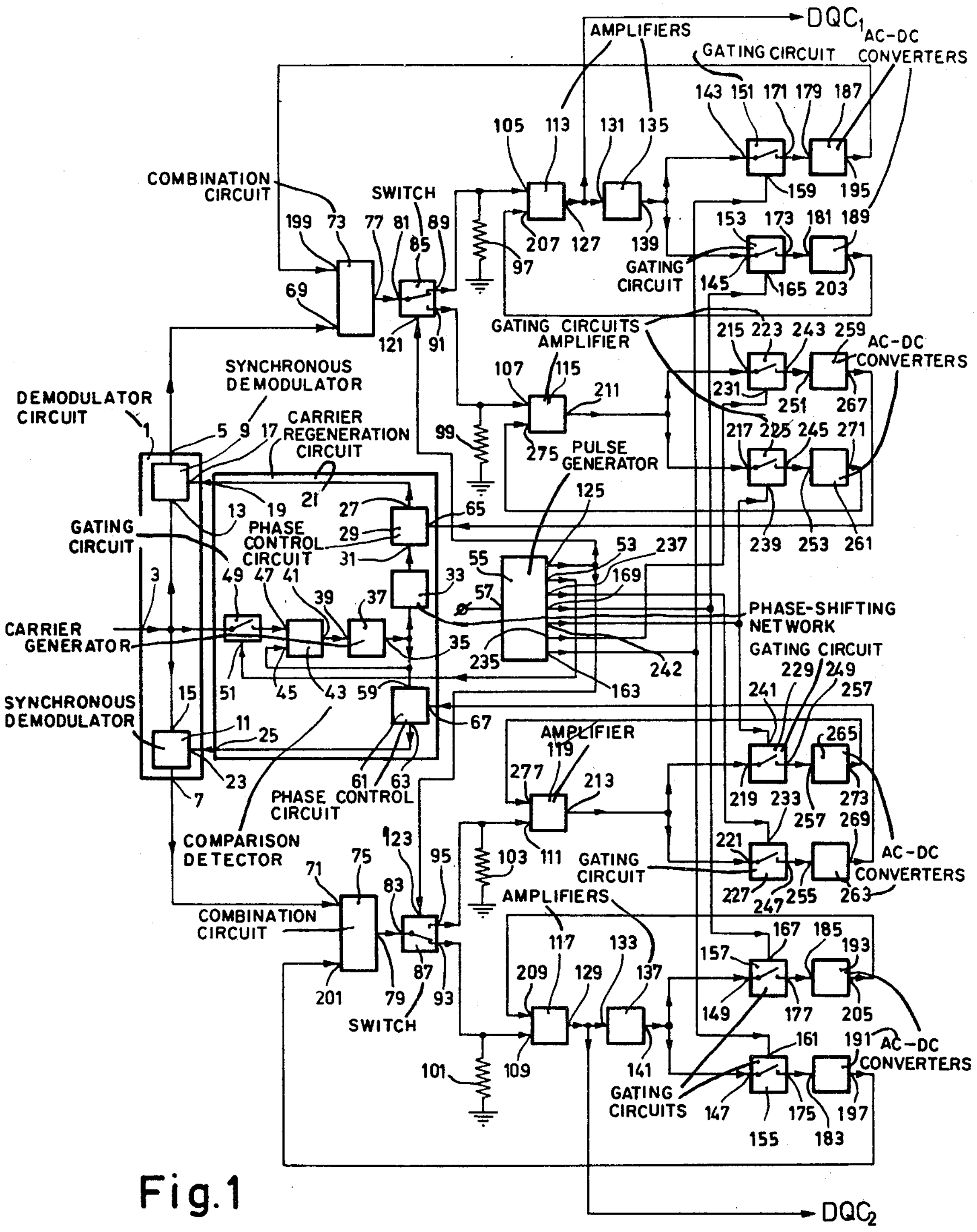

*INVENTORS*
JOHN R. REYNDERS
MARIE M.A.A.GH. VERSTRAELEN
BY
Frank R. Trifari
AGENT

INVENTORS
JOHN R. REYNDERS
MARIE M.A.A.GH. VERSTRAELEN
BY
AGENT

DECODER ARRANGEMENT FOR A SIGNAL TRANSMISSION SYSTEM EMPLOYING INFORMATION TRANSMISSION BY MEANS OF A QUADRATURE-MODULATED CARRIER

The invention relates to a decoder arrangement for a signal transmission system employing information transmission by means of a quadrature-modulated carrier wherein a first information signal is modulated on a first carrier quadrature component and a second information signal is modulated on a second carrier quadrature component and wherein a periodically occurring first carrier synchronizing signal is modulated on the first carrier quadrature component and a second carrier synchronizing signal likewise occurring periodically at an instant other than does the first signal is modulated on the second carrier quadrature component, the circuit arrangement including a demodulator circuit having an input, a first output, a second output, a first and a second synchronous demodulator for synchronous demodulation of the first and second quadrature components, a carrier regeneration circuit and a first and a second gating circuit passing the first and the second carrier synchronizing signals at their instants of occurrence, a signal input of said first demodulator being coupled to the input of the demodulator circuit and a carrier signal input being coupled to the first output of the carrier regeneration circuit, a signal input of said second demodulator being coupled to the input of the demodulator circuit and a carrier signal input being coupled to a second output of the carrier regeneration circuit.

A decoder arrangement of the kind described above is known from French Pat. specification No. 1,415,318 in a color television system wherein a carrier regenerator of the synchronized type (locked oscillator) is brought to the correct phase at the commencement of a line period by each of the carrier synchronizing signals whereafter the control of each of these oscillators is taken over by the associated carrier quadrature component modulated by a color difference signal.

In some quadrature-modulated systems it is necessary to obtain a very slight crosstalk among the components themselves during the demodulation of the quadrature carrier components.

An object of the present invention is to provide a decoder arrangement which satisfies this condition.

According to the invention a decoder arrangement of the kind described in the preamble is characterized in that the carrier regeneration circuit has a first phase control circuit coupled to the first output thereof including a first phase control signal input and a second phase control circuit coupled to the output thereof including a second phase control signal input, while the first gating circuit is incorporated in the signal path from the input of the demodulator circuit to the second phase control signal input and the second gating circuit is incorporated in the signal path from the input of the demodulator circuit to the first phase control signal input.

Due to this step, each quadrature component is demodulated in accordance with a demodulation axis which differs by 90°in phase, from the modulation axis of the other quadrature component. As a result, a crosstalk of the quadrature components among themselves during demodulation is avoided even if the phase difference between the modulation axes deviates from 90° which is often difficult to avoid in systems which operate at high carrier frequencies.

Due to the extremely low crosstalk among the quadrature components, the decoder arrangement according to the invention is highly suitable for a carrier communication active at high frequencies between a television camera and a central operating device for one or more of these cameras. Due to the quickly changing circumstances under which a camera must operate in such a system, a deviation of the desired phase angle of 90° between the quadrature components may occur such that an inadmissible crosstalk will occur in the decoder arrangements commonly used in prior systems. A further use for which a very slight crosstalk between two quadrature components is generally desired is an aperture correction circuit such as is described, for example, in U.S. Pat. No. 2,929,870 wherein an undelayed signal and a signal already delayed by one delay line are transmitted simultaneously as quadrature components through said delay line and are thereafter demodulated and further handled.

Figure 2:
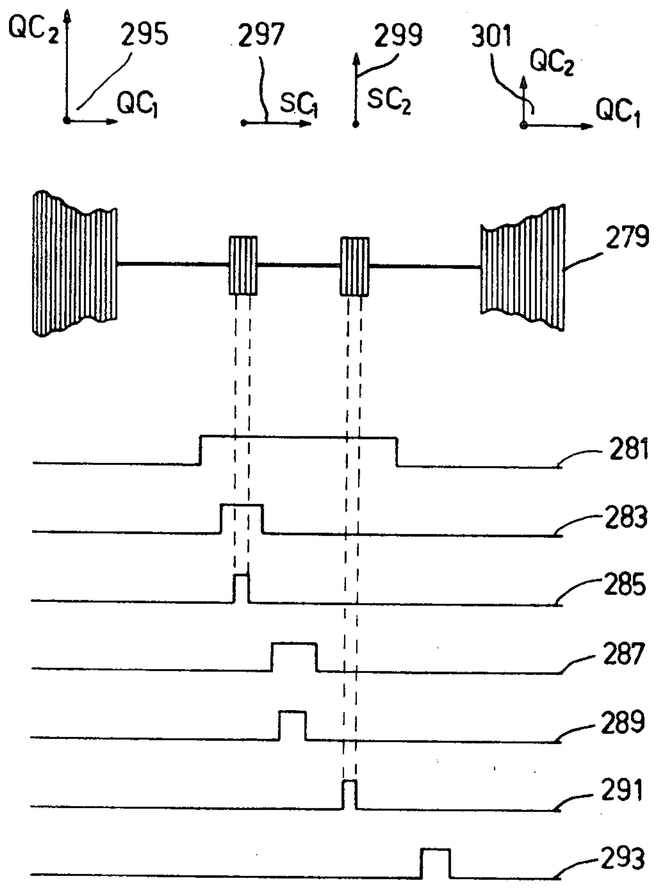
Figure 3:
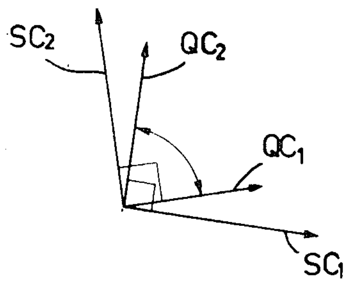

In order that the invention may be readily carried into effect, a few embodiments thereof will now be described in detail by way of example with reference to the accompanying diagrammatic drawings, in which:

FIG. 1 shows a decoder arrangement according to the invention with reference to a nondetailed block diagram, FIG. 2 shows a plurality of voltage or current waveforms as occur in the circuit arrangement of FIG. 1 with reference to an amplitude-time diagram FIG. 3 shows a phasor diagram of a signal to be handled by a decoder arrangement according to FIG. 1, wherein the quadrature components have a mutual phase shift differing from 90°, and of the regenerated carrier components to be obtained with the aid of such a decoder arrangement.

In FIG. 1 a demodulator circuit 1 has an input 3, a first output 5 and a second output 7. The first output 5 is also the output of a first synchronous demodulator 9 and the second output 7 is also the output of a second synchronous demodulator 11. The first synchronous demodulator 9 has a signal input 13 which likewise as a signal input 15 of the second synchronous demodulator 11 is connected to the input 3 of the demodulator circuit 1. Furthermore, a carrier signal input 17 of the first synchronous demodulator 9 is connected to a first output 19 of a carrier regeneration circuit 21. A carrier signal input 23 of the second synchronous demodulator 11 is connected to a second output 25 of the carrier regeneration circuit 21.

The first output 19 of the carrier regeneration circuit 21 is connected to an output 27 of a first phase control circuit 29. An input 31 of this phase control circuit 29 is connected through a 90° phase-shifting network 33 to an output 35 of a carrier generator 37.

The carrier generator 37 has a control signal input 39 which is connected to an output 41 of a comparison detector 43. An input 45 of the comparison detector 43 is connected to the output 35 of the carrier generator 37 and an input 47 is connected through a gating circuit 49 to the input 3 of the demodulator circuit 1. An operation signal input 51 of the gating circuit 49 is connected to an output 53 of a gating pulse generator 55 which has a control pulse input 57.

Furthermore, the output 35 of the carrier generator 37 is connected to an input 59 of a second phase control circuit 61 an output 63 of which is connected to the second output 25 of the carrier regeneration circuit 21.

The phase control circuits 29 and 61 each have a phase control signal input 65 and 67, respectively, whose connections to the rest of the circuit arrangement will be indicated hereinafter.

The first and second outputs 5 and 7 of the demodulator circuit 1 are connected to inputs 69 and 71 of combination circuits 73 and 75, respectively, whose outputs 77 and 79 are connected to inputs 81 and 83 of changeover switches 85 and 87, respectively.

Each of the changeover switches 85 and 87 has two outputs 89, 91 and 93, 95 which are connected to ground through resistors 97, 99 and 101, 103, respectively, and, furthermore, they are each connected to inputs 105, 107 and 109, 111 of a plurality of differential amplifiers 113, 115 and 117, 119, respectively. The value of the resistor 97 is preferably substantially equal to that of the resistor 99. Also, the values of the resistors 101 and 103 are preferably substantially equal.

Furthermore the changeover switches 85 and 87 have operation signal inputs 121 and 123, respectively, which are connected to an output 125 of the pulse generator 55.

The differential amplifiers 113 and 117 have outputs 127 and 129 from which demodulated information signals $DQC_1$ and $DQC_2$, respectively, can be derived and which are furthermore connected to inputs 131 and 133 of amplifiers 135 and 137, respectively. Outputs 139 and 141 of the amplifiers 135 and 137 are connected to inputs 143 and 145, and 147 and 149 of gating circuits 151, 153 and 155, 157, respectively. The gating circuits 151 and 155 have operation signal inputs 159 and 161, respectively, which are connected to an output 163 of the pulse generator 55. Operation signal inputs 165 and 167 of the gating circuits 153 and 157, respectively, are connected to an output 169 of the pulse generator 55.

The gating circuits 151, 153, 155 and 157 have outputs 171, 173, 175, 177, which are each connected to inputs 179, 181, 183 and 185 of AC-DC converters 187, 189, 191, 193, respectively. If desired, these converters may include one or more amplifier stages. Outputs 195 and 197 of the converters 187 and 191 are connected to further inputs 199 and 201 of the combination circuits 73 and 75, respectively.

Outputs 203 and 205 of the AC-DC converters 189 and 193 are connected to further inputs 207 and 209 of the differential amplifiers 113 and 115, respectively.

Each of the differential amplifiers 115 and 119 has outputs 211 and 213 which are connected to inputs 215, 217 and 219, 221 of gating circuits 223, 225, 227 and 229, respectively.

The gating circuits 223 and 227 have operation signal inputs 231 and 233 which are connected to outputs 235 and 237, respectively, of the pulse generator 55. Operation signal inputs 239 and 241 of the gating circuits 235 and 229, respectively, are connected to an output 243 of the gating pulse generator 55.

Outputs 243, 245, 247 and 249 of the gating circuits 223, 225, 227 and 229 are connected to inputs 251, 253, 255 and 257 of AC-DC converters 259, 261, 263 and 265, respectively. These converters 259, 261, 263 and 265 may likewise optionally include one or more amplifier stages. OUtputs 267 and 269 of the AC-DC converters 259 and 263 are connected to the first phase control signal input 63 and the second phase control signal input 67, respectively, of the carrier regeneration circuit 21. Outputs 271 and 273 of the AC-DC converter 261 and 265 are connected to further inputs 275 and 277 of the differential amplifiers 115 and 119, respectively.

The operation of the decoder arrangement of FIG. 1 will be described hereinafter with reference to FIGS. 2 and 3.

FIG. 2 shows diagrammatically eight amplitude-time diagrams 279, 281, 283, 285, 287, 289, 291 and 293 of voltage or current waveforms at the input 3 of the demodulator circuit 1 and the outputs 125, 53, 237, 169, 242, 235 and 163, respectively, of the pulse generator 55 of the decoder circuit of FIG. 1. Four pointer diagrams of the phase relations assumed at the relevant instants in the signal at the input 3 are shown above the amplitude-time diagram of the signal denoted by the reference numeral 279 at this input 3 of the demodulator circuit 1.

The operation of the decoder circuit of FIG. 1 is as follows. A quadrature-modulated signal 279 having two quadrature components $QC_1$ and $QC_2$ (see 295 and 301 in FIG. 2 and FIG. 3) is applied to the input 3 of the demodulator circuit 1. This signal is synchronously demodulated under a different phase angle in each of the demodulators 9 and 11 with the aid of carrier signals regenerated in the carrier generator 37 and applied to the inputs 17 and 23 thereof. As a result of the steps according to the invention these carrier signals, which are denoted by $SC_1$ and $SC_2$ in FIG. 3, each have a phase differing 90° from the quadrature component which is not to be modulated in the relevant synchronous demodulator. This is a first carrier signal $SC_1$ (FIG. 3) at the input 17 of the demodulator 9, which signal has a phase differing 90° from the second quadrature component $QC_2$ which is not to be demodulated in the demodulator 9. As a result substantially no output signal occurs at the output 5 of the demodulator 9 due to the second quadrature component $QC_2$ and mainly only due to the first quadrature component $QC_1$. Likewise a demodulated signal which does not contain substantially any information from the first quadrature component $QC_1$ and mainly only information from the second quadrature component $QC_2$ appears at the output 7 of the second synchronous demodulator 11, because the carrier signal applied to the carrier signal input 23 thereof has a phase differing 90° from the first quadrature component $Q_1$. According to the invention the phase control system of the decoder arrangement is built up in such a manner that the phase difference of 90° already mentioned above and shown in FIG. 3 between the regenerated carrier $SC_1$ and the second quadrature component $SC_2$ not to be demodulated is maintained very accurately at the first demodulator 9 simultaneously with the phase difference of 90° between the regenerated carrier $SC_2$ and the first quadrature component $QC_1$ not to be demodulated at the second demodulator 11. These phase relations of the signals at the two demodulators 9 and 11 are also maintained when the phase angle between the two quadrature components $QC_1$ and $QC_2$ in the signal to be demodulated might deviate from 90° as is shown in FIG. 3.

A minimum amount of crosstalk from the unwanted to the wanted demodulated quadrature component thus occurs at the outputs 5 and 7 of the demodulators 9 and 11.

The phase control system by which the above-described phase relations are maintained includes three main groups, a coarse control with the aid of a control loop being directly active on the carrier generator 37 and two fine controls each of which is active with the aid of a phase control circuit 29 or 61 on an output signal of the carrier generator 37 to be applied to one of the demodulators 9 and 11.

For the coarse control, either of the two periodically occurring carrier synchronizing signals 297 or 299, for example, the first carrier synchronizing signal 297 in the case shown is applied periodically from the signal to be decoded at the input 3 to the input of the comparison detector 43 with the aid of the gating circuit 51. The selection in the gating circuit 49 is effected with the aid of the operation signal 283 shown in FIG. 2, applied to the operation signal input 51 thereof and originating from the output 53 of the pulse generator 55.

The frequency and phase of this first carrier synchronizing signal applied to the input 47 of the comparison detector 43 are compared therein with the frequency and phase of a carrier signal applied to the input 45 and originating from the output 35. With the aid of a control signal originating from the output 41 of the comparison detector 43 and applied to the control signal input 39 of the carrier generator 37 the frequency of the signal at the output 35 of this oscillator is corrected and is rendered substantially equal to the frequency of the first carrier synchronizing signal 297 and the phase thereof is rendered substantially 90° different therefrom as a result of the comparison detector 43 formed as a synchronous demodulator.

The output signal of the carrier generator 37 is applied through the 90° phase-shifting network 33 and the first phase control circuit 29 to the first demodulator 9 and through the second phase control circuit 61 to the second demodulator 11. A phase fine control is active on each of these phase control circuits 29 and 61 which control will now be further described.

The demodulated signal originating from the output 5 of the first demodulator 9 is applied to the input 69 of the combination circuit 73. A control voltage which maintains the black level in the demodulated signal constant is applied to the input 199 of this combination circuit 73. A combination, for example, the sum or the difference of these two signals is applied from the output 77 of the combination circuit 73 to the input 81 of the changeover switch 85. Whenever the first and the second synchronizing signals occur and during the period therebetween the changeover switch 85 is in the position not shown. This is achieved by an operation signal diagrammatically shown by the waveform 281 in FIG. 2, applied to the input 121 of the switch and originating from the output 125 of the pulse generator 55. During the rest of the period the changeover switch 85 is in the position shown.

In the position shown of the changeover switch 85 the output signal from the combination circuit 73 which includes the signal demodulated in the demodulator 9 is applied to the input 105 of the differential amplifier 113. A level control signal is applied to the other input 207 of this differential amplifier 113. The differential amplifier 113 and part of the subsequent circuit serve to maintain the difference in the levels between this output signal and the control signal at the level control signal input 207 as small as possible in the signal at the output 127 of the differential amplifier 113.

The signal which becomes available at the output 127 of the differential amplifier 113 is the demodulated first quadrature component DQC including the first information signal which was modulated on the first quadrature component $QC_1$. This signal can now be used for further handling in a circuit, for example, in a color television receiver or an aperture correction system. For obtaining level control signals it is applied through the amplifier 135 to the inputs 143 and 145 of the gating circuits 151 and 153, respectively. The gating circuits 151 and 153 are periodically rendered conducting by a pulsatory voltage diagrammatically shown by the waveforms 293 and 287, respectively. The gating circuit 153 conducts whenever the changeover switch 85 is in the position not shown. The input 105 of the differential amplifier is then connected to ground through the resistor 97. A pulsatory voltage the amplitude of which is dependent on the output voltage of the differential amplifier 113 at the instant of occurrence of the operation pulse 287 is then produced at the output 173 of the gating circuit 153. This pulsatory voltage is applied to the input 181 of the AC-DC converter 189 which provides a direct voltage at its output 203 the value of which voltage depends on the amplitude of the pulsatory voltage. This direct voltage is applied to the input 207 of the differential amplifier 113 which will provide an output voltage which will attempt to render the difference between the voltages at the inputs 105 and 107 of the differential amplifier as small as possible. A direct voltage controlled at a constant value is then present at the input 207, which voltage serves as a reference voltage when the changeover switch 85 is in the other position shown.

When the changeover switch 85 is in the position shown, the gating circuit 151 passes the output signal from the differential amplifier 113 applied through the amplifier 135 during the occurrence of the operation pulse 293 when a reference level is present in the signal applied to the input 105 of the differential amplifier 113. This output signal is a measure of the difference between the voltages at the inputs 105 and 207 of the differential amplifier 113 and hence between the reference level in the signal applied through the changeover switch 85 to the input 105 and the reference voltage at the input 207. A direct voltage is derived by the AC-DC converter 187 from the pulse signal thus produced at the output 171 of the gating circuit 151, which direct voltage is applied to the input 199 of the combination circuit 73 and is again applied to the input 105 of the differential amplifier 113 through this combination circuit 73 and the changeover switch 85. This control circuit renders the difference in the voltages at the inputs 105 and 107 as small as possible, and hence the reference level in the signal at the input 105 is controlled at a constant value.

The changeover switch 85 comes in the position not shown as a result of the pulse diagrammatically shown by the waveform 281 in FIG. 2. During the occurrence of this pulse the synchronizing signals demodulated by the first demodulator 9 occur in the signal at the input 69 of the combination circuit 73. These signals are applied to the input 107 of the differential amplifier 115 and are passed on in amplified form to the output 211 thereof.

A reference level in the input signal applied through the changeover switch 85 to the input 107 of the differential amplifier 115 is present between the two demodulated synchronizing signals. A level dependent on this reference level appears at the output of the differential amplifier 115 which level is passed on to the input 253 of the AC-DC converter 261 during the occurrence of the operation pulse shown diagrammatically by the waveform 289 in FIG. 2 and applied to the operation signal input 239 of the gating circuit 225. This converter provides a control voltage at its output 271 which is applied to the input 275 of the differential amplifier 115 and attempts to render the difference between the voltage occurring at the instant of the operation pulse 289 at the inputs 107 and 275 of the differential amplifier 115 as small as possible.

The control voltage at the input 275 of the differential amplifier 115 serves as a comparison level during the occurrence of the demodulated second synchronizing signal at the input 107. A voltage which is passed on to the AC-DC converter 259 during part of said period by the gating circuit 223 then occurs at the output 211 of the differential amplifier 115. The gating circuit 223 is then made to pass the voltage with the aid of the operation pulse applied to its operation signal input 231 and diagrammatically shown by the waveform 291 in FIG. 2. This operation pulse lasts shorter than the second synchronizing signal in order to eliminate switch-on and switch-off phenomena during the measurement of the level of the demodulated second synchronizing signal. A control voltage which is applied to the phase control signal input 65 of the first phase control circuit 29 is produced at the output 267 of the AC-DC converter 259. As a result the phase of the carrier signal applied to the carrier signal input 27 of the first demodulator 9 is adjusted in such a manner that the voltages at the inputs 107 and 275 of the differential amplifier 115 become substantially equal during the occurrence of the second synchronizing signal. This is the case when the demodulated second synchronizing signal at the output 5 of the first demodulator 9 is as small as possible. This means that the phase of the carrier signal at the input 17 thereof differs as accurately as possible by 90° from the phase of the second synchronizing signal.

Similarly, the carrier signal at the input 23 of the second demodulator 11 is made to differ 90° in phase as accurately possible from the first synchronizing signal. This is achieved in that the gating circuit 227 is made to pass the voltage with the aid of the operation pulse diagrammatically shown by the waveform 285 in FIG. 2 and applied to the operation signal input 233 during part of the period when this first synchronizing signal occurs. As a result a control voltage which ensures the desired phase control is produced at the output 269 of the AC-DC converter 263. The function of the changeover switch 87 is then analogous to that of the changeover switch 85, the function of the differential amplifiers 117 and 119 is analogous to that of the differential amplifiers 113 and 115, respectively, the function of the gating circuits 155, 157 and 229 is analogous to that of the gating circuits 151, 153 and 225, respectively, the function of the combination circuit 75 is analogous to that of the combination circuit 73, the function of the amplifier 137 is analogous to that of the amplifier 135 and the function of the AC-DC converters 191, 193 and 265 is analogous to that of the AC-DC converters 187, 189 and 261, respectively.

Thus all these functions need not be dealt with further. It is sufficient to mention that the demodulated information signal portion $DQC_2$ of the second quadrature component may be derived from the output 129 of the differential amplifier 117.

As a result of the above-described gating and control circuits the demodulated signals $DQC_1$ and $DQC_2$ may have a completely flat variation during the period when no information occurs, so that clamping circuits may be active without any difficulty during this period in a further circuit for handling these signals.

In the above-described embodiment the coarse control of the oscillator phase was performed with the aid of the first synchronizing signal. Of course this may be effected, if desired, with the aid of the second synchronizing signal: the phase-shifting network 33 may then be omitted and a 90° phase-shifting network must be incorporated between the output 35 of the carrier generator 37 and the input 59 of the second phase control circuit 61.

The carrier generator 37 may be formed, for example, as a filter circuit (so-called passive integrator) in which case the phase coarse control may be omitted, if desired.

It will be evident to those skilled in the art that the sequence of the carrier synchronizing signals may be different and may alternatively occur, for example, alternately if only the relevant gating circuits are operated at the correct instants. When only one of the synchronizing signals alternately occurs during the line flyback period, an identification circuit will be necessary so as to know which synchronizing signal occurs at the relevant instant.

Either of the phase control circuits 29 or 61 may optionally be adapted, in such a manner that also the frequency and phase coarse control is effected thereon so that the above-described control on the generator 43 may be omitted. The carrier signal for the other demodulator must then be derived from the output of this combined coarse and fine control circuit and must be applied through the other phase fine control circuit to the other demodulator.

The combination circuits 73 and 75 may be adder or subtractor circuits dependent on the polarity of the signals applied thereto.

As will be evident to those skilled in the art it is furthermore possible, for example, to make a circuit having separate demodulator for both the synchronizing signals and the information signals. However, for a very accurately operating circuit arrangement it will generally be preferred to handle the information and synchronizing signals in a combined manner as long as possible, as is done in the embodiment described above.

What is claimed is:

1. A decoder arrangement for a signal transmission system employing information transmission by means of a quadrature-modulated carrier wherein a first information signal is modulated on a first carrier quadrature component and a second information signal is modulated on a second carrier quadrature component and wherein a periodically occurring first carrier synchronizing signal is modulated on the first carrier quadrature component and a second carrier synchronizing signal likewise occurring periodically at an instant other than does the first carrier synchronizing signal is modulated on the second carrier quadrature component, respectively, a carrier regeneration circuit comprising a first phase control circuit having a first phase control signal input means and a second phase control circuit having a second phase control signal input means, and first and second gating circuits for passing the first and the second carrier synchronizing signals respectively at their respective instants of occurrence, signal input means of the demodulator circuit being coupled to input means of the first synchronous demodulator and input means of the second synchronous demodulator respectively, said first gating circuit being in the signal path between an input means of the demodulator circuit and said first phase control signal input means, said second gating circuit being in the signal path between the input means of the demodulator circuit and said second phase control signal input means.

2. A decoder arrangement as claimed in claim 1, further comprising two changeover switches and a pulse generator, one of the changeover switches being coupled to an output means of the first synchronous demodulator, the other of the changeover switches being coupled to an output means of the second synchronous demodulator, a first output signal from the pulse generator being coupled to both of the changeover switches, a second output signal from the pulse generator being coupled to an information signal path, a third output signal being coupled to a carrier synchronization signal path, said carrier synchronization path incorporating the first and the second gating circuits.

3. A decoder arrangement as claimed in claim 2, further comprising two differential amplifiers each having a first input means coupled respectively to one of the changeover switches and each having a second input means coupled respectively to an output means thereof through a keyed level control circuit.

4. A decoder arrangement as claimed in claim 2, wherein an output of one information signal path is coupled through a keyed black level clamping control circuit to a combination circuit incorporated between the corresponding demodulator and the input of the changeover switch.

5. A decoder arrangement as claimed in claim 1, wherein the carrier regeneration circuit comprises a frequency control circuit have a detector as input of which is coupled through a third gating circuit to the input of the demodulator circuit and a further input of which is coupled to an output signal of the carrier regenerator circuit.

* * * * *